US011979286B1

(12) United States Patent
Koundinya et al.

(10) Patent No.: US 11,979,286 B1
(45) Date of Patent: May 7, 2024

(54) IN-SERVICE SOFTWARE UPGRADE IN A VIRTUAL SWITCHING STACK

(71) Applicant: Hewlett Packard Enterprise Development LP, Houston, TX (US)

(72) Inventors: Chivukula Koundinya, Bangalore (IN); Balaji Sankaran, Bangalore (IN); Sivakumar Murugan, Bangalore (IN); Francisco José Rojas Fonseca, Alajuela (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/967,659

(22) Filed: Oct. 17, 2022

(51) Int. Cl.
*G06F 15/177* (2006.01)
*G06F 8/65* (2018.01)
*G06F 16/27* (2019.01)
*H04L 41/082* (2022.01)
*H04L 41/0895* (2022.01)
*H04L 49/00* (2022.01)

(52) U.S. Cl.
CPC ............. *H04L 41/082* (2013.01); *G06F 8/65* (2013.01); *G06F 16/27* (2019.01); *H04L 41/0895* (2022.05); *H04L 49/70* (2013.01)

(58) Field of Classification Search
CPC ... H04L 41/082; H04L 41/0895; H04L 49/70; G06F 16/27; G06F 8/65
USPC ................................................. 709/220, 221
See application file for complete search history.

(56) References Cited

U.S. PATENT DOCUMENTS

| 9,602,441 | B2* | 3/2017 | Kamble | H04L 41/12 |
| 11,405,272 | B1* | 8/2022 | Khan | H04L 41/0895 |
| 2007/0255868 | A1* | 11/2007 | Chahal | G06F 13/387 |
| | | | | 710/62 |
| 2016/0191316 | A1* | 6/2016 | Guntaka | H04L 41/082 |
| | | | | 370/254 |
| 2021/0119878 | A1* | 4/2021 | Loftus | H04L 41/12 |
| 2022/0091870 | A1* | 3/2022 | Khan | H04L 49/70 |
| 2022/0094645 | A1* | 3/2022 | Khan | H04L 69/08 |
| 2023/0092836 | A1* | 3/2023 | Koundinya | H04L 45/583 |
| | | | | 370/254 |

* cited by examiner

*Primary Examiner* — Liang Che A Wang
(74) *Attorney, Agent, or Firm* — Yao Legal Services, Inc.

(57) ABSTRACT

One aspect of the present technology can provide a system for facilitating in-service software upgrade (ISSU) for a switch in a virtual switching stack. During operation, the system can initiate ISSU that facilitate uninterrupted traffic flow. The system can upgrade a first set of daemons of the switch that manage operations of the switch. The system can also upgrade a database stored on the switch. The database can store operational information of the switch. The system can further upgrade a second set of daemons of the switch that configure forwarding information on the forwarding hardware of the switch and facilitate data-plane operations for the switch. The forwarding information configured on the forwarding hardware can remain unchanged during the upgrade. The system can configure the upgraded second set of daemons to obtain control-plane information from a standby switch of a conductor switch of the virtual switching stack.

20 Claims, 10 Drawing Sheets

IN-SERVICE SOFTWARE UPGRADE IN A VIRTUAL SWITCHING STACK

BACKGROUND

Field

The present disclosure relates to communication networks. More specifically, the present disclosure relates to a method and system for facilitating in-service software upgrade without traffic interruption in a network operating as a virtual switching stack.

BRIEF DESCRIPTION OF THE FIGURES

In the figures, like reference numerals refer to the same figure elements.

DETAILED DESCRIPTION

Figure 1A:
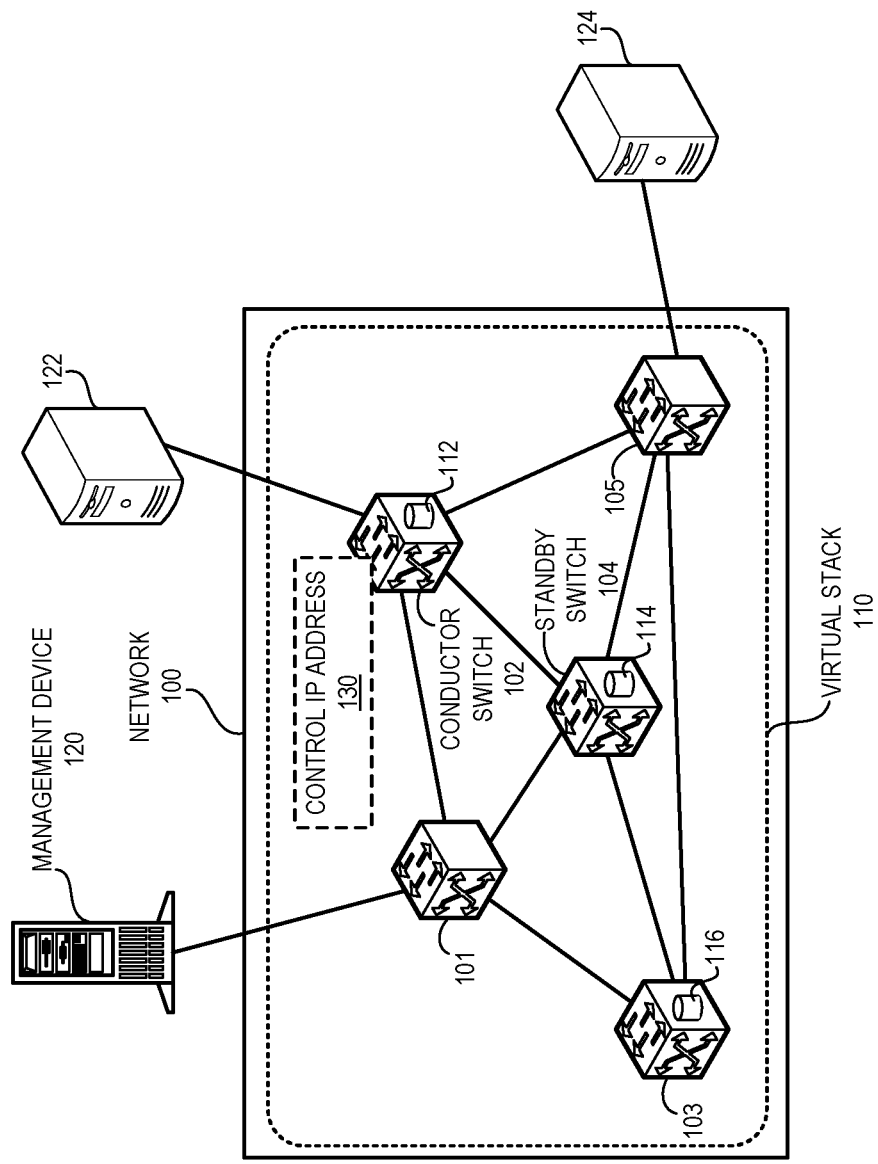
FIG. 1A illustrates an example of a virtual switching stack supporting interruption-free in-service software upgrade (ISSU), in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought a progressively increasing amount of network traffic. As a result, equipment vendors race to build switches with versatile capabilities, such as in-service software upgrade, which allows a switch to upgrade its operating software (e.g., install the binary of a new switch image) while remaining in service. This allows the switches of a network to upgrade the software of the switch without interrupting the flow of traffic through the network.

Typically, in a complex network, such as a virtual switching stack, different switches are assigned different roles. When a switch is assigned a role, the switch may require performing a particular set of operations. For example, a switch can be tasked to maintain the control plane information while another switch can operate as a member switch in the complex network. For such a network, ISSU for these two switches may impact the flow of traffic in the network differently. As a result, deploying ISSU in a complex network can be challenging and may need to be orchestrated so that the interruption to the traffic flow through the network can be reduced.

The aspects described herein solve the problem of facilitating ISSU in a virtual switching stack without interrupting the flow of traffic by (i) orchestrating the ISSU among switches of different roles in the stack in different phases such that the flow of traffic remains interrupted; and (ii) upgrading a subset of software elements of a subset of the switches of the stack at each phase based on the respective roles of the switches. Front Plane Stacking (FPS) is a network virtualization technology that can virtualize a plurality of physical switches (e.g., in the same layer) into one virtual switching stack. The stack can operate a unified control plane. Consequently, the stack may appear as a single switch to the upper- and lower-layer devices.

To facilitate the control and operations of the stack, different switches of the stack are configured with different roles, such as a conductor, a standby, and a member. A conductor switch of the stack can maintain the control plane operations while a standby switch operates as a backup for the conductor switch. The rest of the switches can be referred to as member switches. Depending on the roles, the operations of the daemons and the content of the databases at the switches of the stack can be different. The orchestration for the ISSU can upgrade the daemons and database versions (e.g., update database schema) based on the respective roles of the switches such that the data plane of a respective switch can continue to forward traffic during the upgrade process.

With existing technologies, a plurality of switches in a network can be configured with FPS techniques, such as Virtual Switching Framework (VSF), to operate as a virtual switching stack for providing resiliency, scalability, and efficient bandwidth utilization. The switches in the stack can be coupled to each other via inter-switch links (e.g., point-to-point copper or fiber links). The switches in the stack can use these links to forward encapsulated data plane traffic and exchange control plane traffic. Typically, the conductor switch can run the control plane daemons, such as routing and management protocol daemons, and propagate the resultant control information, such as a new route, to other switches of the stack. The control plane traffic allows the stack to maintain its topology and states for operating as a single logical switch.

Similar to any computing technology, the piece of software that facilitate the daemons on a respective switch can be upgraded to improve the performance, stability, and security of the stack. The upgraded software can be incorporated into a new switch image deployable on the switches of the stack. Since the switches in an operational stack can actively forward traffic, the new switch image may need to be installed while the stack remains in service. ISSU can allow a user (e.g., an administrator) to install the new switch image in switches while the stack continues to forward traffic.

However, ISSU may not be supported in the stack. The switches in the stack can be upgraded using a rolling stack upgrade mechanism where a respective switch in the stack can be upgraded one after another till all switches in the stack are upgraded. With the rolling upgrade approach, the switch being upgraded may require a reboot, which can stop packet forwarding at the switch during the rebooting process. As a result, that switch may become unavailable for a period, thereby impacting the flow of traffic through the stack. Consequently, if the stack includes a large number of switches, the combined unavailability period for the stack during the rolling upgrade process can become significant and detrimental to the performance of the stack.

To solve this problem, the switches in the stack can be upgraded in a plurality of phases such that traffic flow is uninterrupted. In each of the phases, a subset of the switches can be selected for ISSU based on the respective roles of the switches. Upon selection, a subset of software elements of a respective selected switch can be selected for upgrading in the phase. The software elements can include daemons and a database server supporting operations of the selected switch that can be upgraded in that phase without interrupting the flow of traffic through the switch. To support this phase-based orchestrated software upgrade, a respective switch of the stack can be equipped with an instance of an upgrade orchestrator facilitating an orchestrated ISSU process in the stack. In each phase, the upgrade orchestrator can only upgrade the software elements of a switch that does not require the switch to stop traffic forwarding. In this way, the orchestrated ISSU process can eventually upgrade the software (e.g., the daemons and the database) of a respective switch of the stack without interruption.

In the first phase, the upgrade orchestrator can install a new switch image, which may include a new database version, on the standby and member switches. The database can be a specialized relational database for network devices (e.g., Open vSwitch Database (OVSDB)). The installation can upgrade and reboot the management daemons and the database of the corresponding switches. The new database version may transition the databases of the corresponding switches to a new database schema. Here, the management daemons can include all daemons of a switch except the line card daemons (or line card agents). Examples of management daemons can include, but are not limited to, control plane daemons that manage control plane protocols and operations, platform daemons that facilitate platform-specific operations, and helper daemons that support the operations of other daemons. On the other hand, line card daemons can obtain control information needed for forwarding a packet (e.g., routes and forwarding ports) and program the forwarding hardware (i.e., the application-specific integrated circuit (ASIC)) of the line card accordingly.

In the second phase, the upgrade orchestrator can freeze the internal states of the line cards of a respective switch to prevent any control plane changes. As a result, the forwarding information associated with the data paths programmed at the switch hardware can remain unchanged while being used for forwarding traffic. The line card daemon on a respective switch of the stack can then be upgraded and rebooted. Hence, the underlying hardware can continue to function without any changes during this phase. Upon rebooting, the upgrade orchestrator can configure the line card daemons, including the line card daemons of the conductor switch, to use the standby switch for subsequent control plane upgrades.

Since the conductor switch can remain responsible for the control plane of the stack, the control plane daemons on the conductor switch can continue to process the control plane upgrades, if any, during the upgrade process and store them in the local database (i.e., the conductor database). However, the changes may not be propagated in the stack because the line card daemons of the stack are configured to obtain upgrades from the standby switch (i.e., from the standby database of the standby switch). This allows the stack to maintain the control plane without impacting the flow of traffic through the stack.

In the third phase, the conductor database is synchronized with the standby database. The control plane upgrades stored in the conductor database can then be propagated to the standby database. Since the line card daemons of the stack are configured to obtain upgrades from the standby switch, the synchronized control plane upgrades can then be propagated in the stack. Subsequently, the upgrade orchestrator can trigger a "failover" that allows the standby switch to start operating as the conductor of the stack. This failover can be considered as artificially triggered because the failover is not triggered due to a failure of the conductor switch.

At this point in time, the standby switch can assume the role of the conductor and initiate the local control plane daemons for operating with the role of a conductor. Since the switches in the stack no longer rely on the previous conductor switch for control information, the upgrade orchestrator can install the new switch image on the previous conductor switch and upgrade the management daemons accordingly. When the upgrade is complete, the previous conductor switch can start operating as the new standby switch. In this way, the upgrade orchestrator can provide an interruption-free orchestrated ISSU process in the stack.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of a virtual switching stack supporting ISSU, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include switches 101, 102, 103, 104, and 105, each of which can be associated with a MAC address and an IP address. A respective switch of network 100 can deploy an instance of a relational database. For example, switches 102, 104, and 103 can deploy databases 112, 114, and 116, respectively. End devices 122 and 124 can be coupled to switches 102 and 105, respectively.

A respective link in network 100 can be a physical link or a tunnel spanning one or more physical links. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). A respective switch pair in network 100 can be a BGP peer. Network 100 can be coupled to a management device 120, which can manage network 100 and provision switches 101, 102, 103, 104, and 105. Furthermore, management device 110 can allow a user (or administrator) to issue instructions to any of these switches to configure the switch.

A user (e.g., a network administrator) can use management device 120 to configure network 100 based on FPS, such as VFS, to virtualize physical switches 101, 102, 103, 104, and 105 into virtual switching stack 110. Stack 110 can operate a unified control plane in network 100 and may appear as a single switch to other devices 122 and 124. To facilitate the control and operations of stack 100, different switches of stack 110 are configured with different roles. In stack 110, switches 102 and 104 can be configured with the roles of a conductor and a standby, respectively, of stack 110. The rest of the switches of network 100 can be configured with a role of a member of stack 110. A member switch may not run a networking protocol and maintain a state. The ports of a member switch can be controlled and programmed by conductor switch 102. If standby switch 102 takes over as a conductor or a new standby switch is required, a member switch can be upgraded to the role of a standby.

Conductor switch 102 can maintain the control plane operations of stack 110 while standby switch 104 operates as a backup for facilitating high availability to conductor switch 102. Conductor switch 102 can also control a respective line card, including the ones in switches 101, 103, 104, and 105, in stack 110. Conductor switch 102 can run control plane daemons, such as routing and management protocol daemons, and propagate the resultant control information, such as a new route, to other switches of stack 110. The control plane traffic allows stack 110 to maintain its topology and states for operating as a single logical switch. Conductor switch 102 can be assigned a control IP address 130, which allows other switches to obtain control information. Depending on the roles, the operations of the daemons and the content of the databases at the switches of stack 110 can be different. Database 112 of conductor switch 102 can be referred to as a conductor database that stores the control information representing the control plane of stack 110. Such control information can include routing and forwarding information.

Database 114 of standby switch 104 can be referred to as a standby database that receives synchronization information (e.g., periodically or in response to an update to the control information) from database 112. As a result, respective control information databases 112 and 114 can remain synchronized. Based on the synchronized information in database 114, standby switch 104 can start operating as a conductor if a failover is triggered. For example, if conductor switch 102 fails, other switches can discover the failure (e.g., due to missing periodic heartbeat messages from switch 102). Upon discovery, switch 104 can assign itself a role of a conductor and start managing the control plane of stack 110 using the local control plane. IP address 130 can then become associated with switch 104. Consequently, other switches can then start obtaining their control information from new conductor switch 104 via IP address 130.

The switches in stack 110 can be coupled to each other via inter-switch links (e.g., point-to-point copper- or fiber-based Ethernet links). The switches in stack 110 can use these links to forward data plane traffic and exchange control plane traffic. A respective packet on an inter-switch link is encapsulated with a stack encapsulation header associated with stack 110. For example, when end device 112 sends an Ethernet packet to end device 114, switch 102 can receive the packet and determine that end device 114 is reachable via switch 105. Switch 102 can then encapsulate the packet with a stack encapsulation header and forward the encapsulated packet to switch 105. The source and destination addresses of the stack encapsulation header can correspond to switches 102 and 105, respectively. Accordingly, when switch 105 receives the encapsulated packet, switch 105 can decapsulate the stack encapsulation header and forward the Ethernet packet to end device 114.

The piece of software that facilitate the daemons on a respective switch of stack 110 can be upgraded to improve the performance, stability, and security of stack 110. The upgraded software can be incorporated into a new switch image deployable on the switches of stack 110. Since the switches in stack 110 can be operational and actively forward traffic, the new switch image may need to be installed while stack 110 remains in service. ISSU can allow the user to install the new switch image in switches while stack 110 continues to forward traffic. With existing technologies, ISSU may not be supported in stack 110 because different switches are allocated different roles. For example, if conductor switch 102 is upgraded with ISSU, the schema for database 112 can be upgraded and hence, may not synchronize with database 114. Therefore, a failover may lead to inconsistency in stack 110.

Furthermore, switches in stack 110 can be upgraded using a rolling stack upgrade mechanism where a respective switch in stack 110 can be upgraded one after another till all switches in stack 110 are upgraded. With the rolling upgrade approach, when switch 105 is upgraded, switch 105 may require a reboot. Consequently, packet forwarding can be stopped at switch 105 during the rebooting process. As a result, switch 105 may become unavailable for a period, thereby impacting the flow of traffic through stack 110. In particular, traffic to and from end device 124 can be dropped when switch 105 is unavailable. Therefore, if stack 110 includes a large number of switches, the combined unavailability period for stack 110 during the rolling upgrade process can become significant and detrimental to the performance of stack 110.

To solve this problem, switches in stack 110 can be upgraded in a plurality of phases such that traffic flow via stack 110 remains uninterrupted. In each of the phases, a subset of the switches of stack 110 can be selected for ISSU based on the respective roles of the switches. Upon selection, a subset of software elements, such as daemons and a database server, of a respective selected switch of stack 110 can be selected for upgrading in the phase. To support this phase-based orchestrated software upgrade, a respective switch of stack 110 can be equipped with an instance of an upgrade orchestrator facilitating the orchestrated ISSU process in stack 110. In each phase, the upgrade orchestrator can only upgrade the software elements of the switch that does not require the switch to stop traffic forwarding. In this way, the upgrade orchestrator can eventually upgrade the software of a respective switch of stack 110 without interruption.

In the first phase, the upgrade orchestrator can install a new switch image, which may include a new database version, on standby switch 102 and member switches 101, 103, and 105. The installation can upgrade and reboot the management daemons and the database of switches 101, 103, 104, and 105. Here, the new database version of database 114 may transition database 114 to a new database schema. The new version of database 114 can then be synchronized with the previous version of database 114. This synchronization populates at least a subset of the columns of the new version of database 114. The management daemons can then start operating using the new version of database 114. The previous version of database 114 can then be removed. This process can be repeated for member switches 101, 103, and 105 as well.

In the second phase, the upgrade orchestrator can freeze the internal states of the line cards of a respective switch of stack 110 to prevent any control plane changes. As a result, the forwarding information associated with the data paths programmed at the forwarding hardware can remain unchanged while being used for forwarding traffic. In other words, the line cards of stack 110 can continue to forward traffic based on existing forwarding information without programming any control plane upgrades. The line card daemon on a respective switch of stack 110 can then be upgraded and rebooted. Upon rebooting, the upgrade orchestrator can configure the line card daemons, including the line card daemons of conductor switch 102, to use standby switch 104 for subsequent control plane upgrades.

Hence, instead of conductor switch 102, standby switch 104 can start controlling a respective line card of stack 110. Since conductor switch 102 can remain responsible for the control plane of stack 110, the control plane daemons on conductor switch 102 can continue to process the control plane upgrades, if any, during the upgrade process and store them in database 112. However, the changes may not be propagated in stack 110 because the line card daemons of stack 110 can then be configured to obtain upgrades from standby database 114 of standby switch 104. This allows stack 110 to maintain the control plane without impacting the flow of traffic through stack 110.

In the third phase, database 112 is synchronized with database 114. The control plane upgrades stored in database 112 can then be propagated to database 114. Since the line card daemons of stack 110 are configured to obtain upgrades from standby switch 104, the synchronized control plane upgrades can then be propagated in stack 110. Subsequently, the upgrade orchestrator can trigger an artificial failover that allows standby switch 104 to start operating as the conductor of stack 110. The failover can be considered to be artificial because it is not triggered due to a failure of conductor switch 102. Furthermore, unlike a regular failover that can transfer the control of stack 110 to standby switch 104, the control of the line cards has already been transferred to standby switch 104.

At this point in time, switch 104 can assume the role of the conductor and initiate the local control plane daemons to operate with the role of a conductor of stack 110. Since the switches in the stack no longer rely on previous conductor switch 102, the upgrade orchestrator can install the new switch image on switch 102 and upgrade the local management daemons accordingly. When the upgrade is complete, switch 102 can start operating as the new standby switch in stack 110. In this way, the upgrade orchestrator can provide an interruption-free orchestrated ISSU process in stack 110.

Figure 1B:
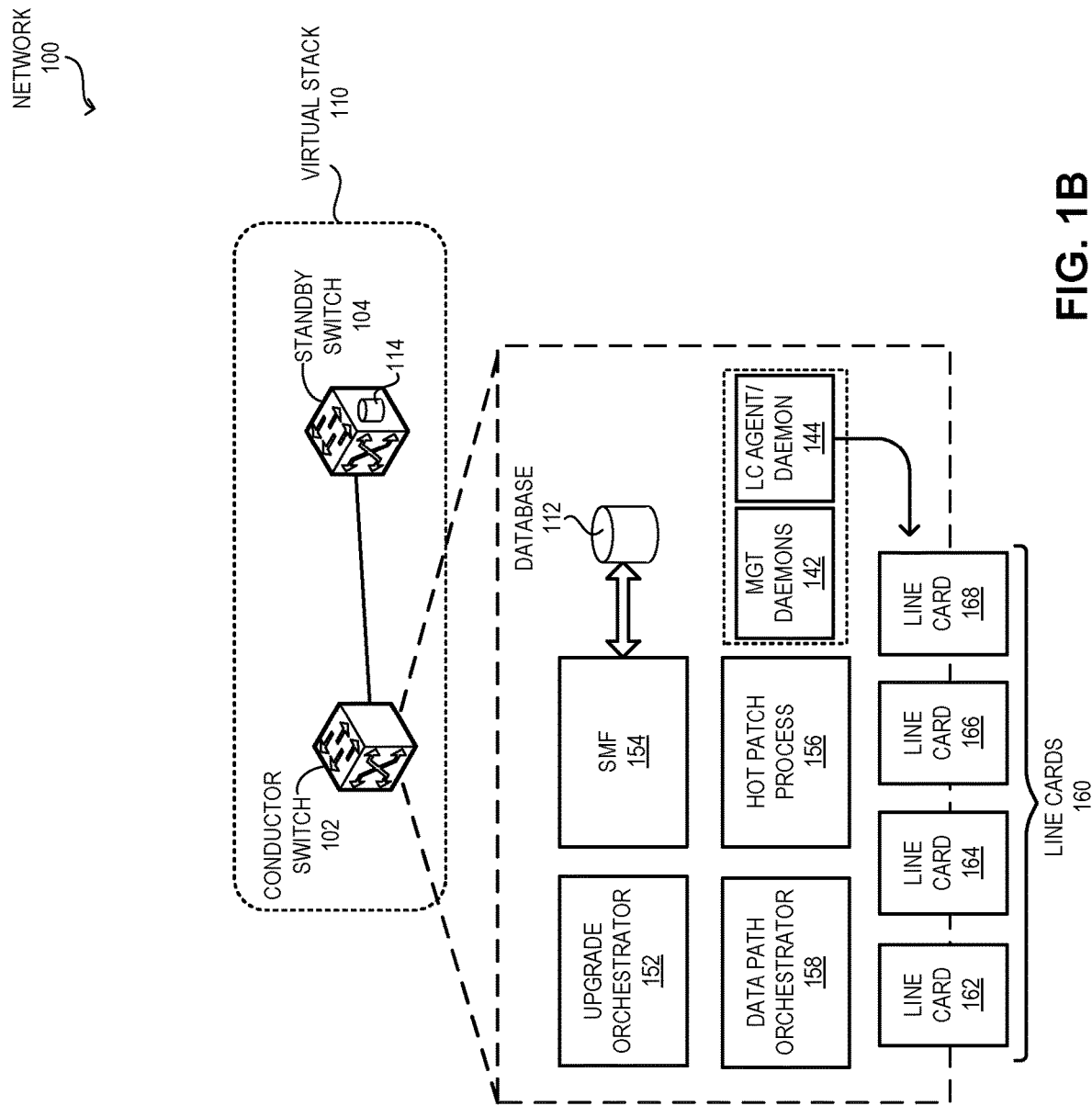
FIG. 1B illustrates an example of a switch in a virtual switching stack supporting interruption-free ISSU, in accordance with an aspect of the present application.

FIG. 1B illustrates an example of a switch in a virtual switching stack supporting interruption-free ISSU, in accordance with an aspect of the present application. Switch 102 can include a database 112, which can be an instance of a specialized relational database for network devices (e.g., an OVSDB instance). Switch 102 may operate a database management system (DBMS) that facilitates database 112. Switch 102 can be equipped with a plurality of line cards 160, which can include line cards 162, 164, 166, and 168. The installation of the binaries of a new switch image on switch 102 can upgrade a version of database 112. The new database version may transition database 112 to a new database schema.

In addition, the installation can upgrade and reboot management daemons 142 and line card daemon (or line card agent) 144 of switch 102. Here, the management daemons can include all daemons of switch 102 except the line card daemon 144. Examples of management daemons 142 can include, but are not limited to, control plane daemons that manage control plane protocols and operations on switch 102, platform daemons that facilitate platform-specific operations to switch 102, and helper daemons that support the operations of other daemons on switch 102. On the other hand, line card daemon 144 can obtain control information needed for forwarding a packet (e.g., routes and forwarding ports) and program the forwarding hardware (i.e., the ASIC) of the line cards 162, 164, 166, and 168.

Furthermore, to facilitate interruption-free ISSU, switch 102 can include an upgrade orchestrator 152, a schema migration framework (SMF) 154, a hot patch process 156, and a data path orchestrator 158. Upgrade orchestrator 152 can include a process for orchestrating ISSU in stack 110. An instance of upgrade orchestrator 152 can run on a respective switch of stack 110. Hot patch process 156 can install the binaries from a new switch image. Since the installation of binaries is performed in phases, upgrade orchestrator 152 can interact with hot patch process 156 to coordinate the phase-wise installation of corresponding binaries.

Furthermore, SMF 154 can migrate the database from an older version to a newer version. Accordingly, SMF 154 can upgrade the schema of the database. For example, switch 102 uses database 112 to maintain states of processes, data plane forwarding tables, and control information. Since the new schema of database 112 may have table structures (e.g., can include a new column for a table), synchronizing between versions of database 112 can be challenging. SMF 154 can identify the corresponding columns of different database versions and migrates the stored data to the new version.

In addition, data path orchestrator 158 can upgrade the line card daemon without impacting the traffic flow through a line card. Data path orchestrator 158 can actively execute on conductor switch 102 and may remain inactive in other switches, such as standby switch 104, of stack 110. Data path orchestrator 158 can migrate data plane forwarding states from the old version of database 112 to the new version. In this way, upgrade orchestrator 152, SMF 154, hot patch process 156, and data path orchestrator 158 can operate in conjunction with each other to facilitate ISSU for switch 102 and stack 110.

Figure 2:
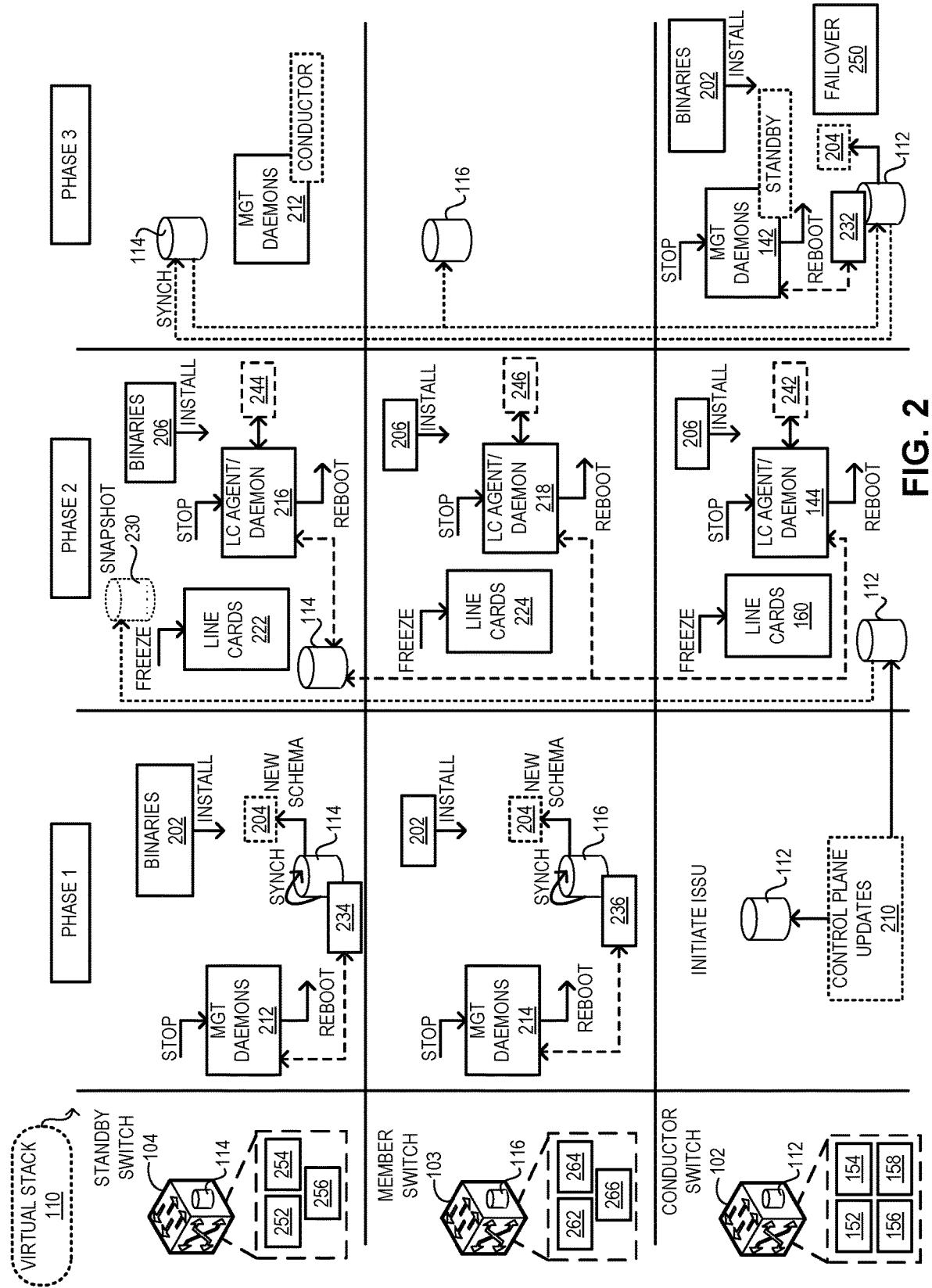
FIG. 2 illustrates an example of the phases of ISSU in a virtual switching stack, in accordance with an aspect of the present application.

Upgrade orchestrator 152 on conductor switch 102 can initiate the ISSU process for stack 110. FIG. 2 illustrates an example of the phases of ISSU in a virtual switching stack, in accordance with an aspect of the present application. During phase one, upgrade orchestrator 152 can upgrade standby switch 104 and member switches, such as switch 103. In this example, the upgrades to switch 103 are also applied to switches 101 and 105 of FIG. 1A. Upgrade orchestrator 152 of conductor switch 102 can stop management daemons 212 of standby switch 104 and management daemons 214 of member switch 103. Upgrade orchestrator 152 can request hot patch processes 256 and 266 of switches 104 and 103, respectively, to install the binaries from a new switch image.

Hot patch processes 256 and 266 can then extract binaries 202 for the management daemons from the switch image and install them on switches 104 and 103, respectively. Furthermore, the installation of binaries 202 can install a new version of database servers 234 and 236 (e.g., OVSDB server) and update the version of databases 114 and 116 of switches 104 and 103, respectively. Accordingly, databases 114 and 116 can transition to a new schema 204 corresponding to the new database version and can operate with database servers 234 and 236, respectively. Since management daemons 142 and database 112 of conductor switch 102 are not upgraded in phase one, conductor switch 102 can continue to run the control plane without interruption. Once binaries 202 are installed, upgrade orchestrators 252 and 262 of switches 104 and 103, respectively, can start the new version of corresponding database servers 234 and 236.

Upgrade orchestrators 252 and 262 can also initiate a table synchronization from the old version to the new version for databases 114 and 116, respectively using SMF 254 and 264 of switches 104 and 103, respectively. The synchronization can include the columns needed for the operations of standby switch 104 and member switch 103. Even though standby switch 104 can maintain a copy of conductor database 112 to support the failover, the copy of conductor database 112 may not be synchronized to the new version, thereby reducing the memory overhead of ISSU. Upgrade orchestrators 252 and 262 can then reboot management daemons 212 and 214, respectively, based on binaries 202. Management daemons 212 and 214 can then connect to database servers 234 and 236, respectively, and resume their operations. In this phase, conductor switch 102 can continue to determine control plane updates 210 and store them in database 112.

In phase two, the line card daemons of stack 110 are upgraded. Data path orchestrator 158 on conductor switch 102 can freeze the data path on all line cards of stack 110, such as line cards 160, 222, and 224 of switches 102, 104, and 103, respectively. The frozen data paths on the line cards can ensure that there are no run-time changes to the line cards during ISSU. To facilitate the operations of the frozen line cards, data path orchestrator 158 can generate a current snapshot 230 of data plane forwarding information of database 112. Snapshot 230 can also be referred to as ISSU cache. Snapshot 230 may not change during the upgrade process. Conductor switch 102 can provide snapshot 230 to standby switch 104, which can then synchronize snapshot 230 with the new version of database 114.

Typically, conductor switch 102 can consider other switches of stack 110, such as standby switch 104 and member switch 103, as line card modules. Accordingly, line card daemons 216 and 218 of switches 104 and 103, respectively, can connect to conductor switch 102 to receive data path information to program the forwarding hardware of local line cards 222 and 224, respectively. Line card daemons 216 and 218 can maintain the internal state of the forwarding hardware in the memory of switches 104 and 103, respectively. Data path orchestrator 158 can instruct line card daemons 144, 216, and 218 of switches 102, 104, and 103, respectively, to store the internal hardware states (e.g., ASIC states) in corresponding state files 242, 244, and 246, respectively. These state files can be warm-boot files that can be used for reconciling hardware states when a piece of hardware is rebooted.

Subsequently, upgrade orchestrators 152, 252, and 262 can stop line card daemons 144, 216, and 218 of switches 102, 104, and 103, respectively. Upgrade orchestrators 152, 252, and 262 can then request hot patch processes 156, 256, and 266, respectively, to install new binaries 206 for the line card daemons on switches 102, 104, and 103, respectively. When the installation is complete, line card daemons 144, 216, and 218 can restart with warm-boot files 242, 244, and 246, respectively, as inputs. Line card daemons 144, 216, and 218 can reconcile with the internal states of local line cards 160, 222, and 224, respectively, using the corresponding warm-boot files.

Upgrade orchestrators 152, 252, and 262 can then instruct line card daemons 144, 216, and 218, respectively, to connect to standby database 114, which can store the forwarding information (e.g., based on snapshot 230) represented in the new database version. Line card daemons 144, 216, and 218 can re-populate the data plane information by connecting to standby database 114 and obtaining corresponding information. In other words, the new versions of line card daemons 144, 216, and 218 can be in synchronization with the data plane stored in the new database version (i.e., based on schema 204) of database 114 on standby switch 104. In this phase, conductor switch 102 can continue to determine control plane updates 210 and store them in database 112.

In phase three, conductor switch 102 is upgraded. Since conductor switch 102 has been storing control plane updates 210 in the old version of database 112, upgrade orchestrator 152 can synchronize database 112 with database 114 based using SMF 154. In this way, control plane updates 210 can be transferred to the new database version that can correspond to schema 204. Upgrade orchestrator 152 can stop management daemons 142 of conductor switch 102 and initiate an artificial failover 250. Management daemons 212 on standby switch 104 can then start operating in the conductor mode and hence, switch 104 can start operating with the role of a conductor in stack 110. To start operating in a conductor mode, the control plane daemons of management daemons 212 can be activated, which can cause switch 104 to start participating in the routing and management protocols.

Upon handing the control to switch 104, upgrade orchestrator 152 can request hot patch process 156 to install the rest of the new switch image since hot patch process 156 has already installed binaries 206 on switch 102. Hot patch process 156 can then install binaries 202 on switch 102. The installation of binaries 202 can install a new version of database server 232 and update the version of database 112 of switch 102. Accordingly, database 112 can transition to new schema 204 corresponding to the new database version and can operate with database server 232. Database 112 can then be synchronized with database 114, thereby ensuring the presence of the most current information in database 112. Management daemons 142 on switch 102 can then reboot and start operating in a standby mode and hence, switch 102 can start operating as the standby switch in stack 110. In this way, the new switch image can be installed on stack 110 using ISSU without impacting the forwarding operations.

Figure 3A:
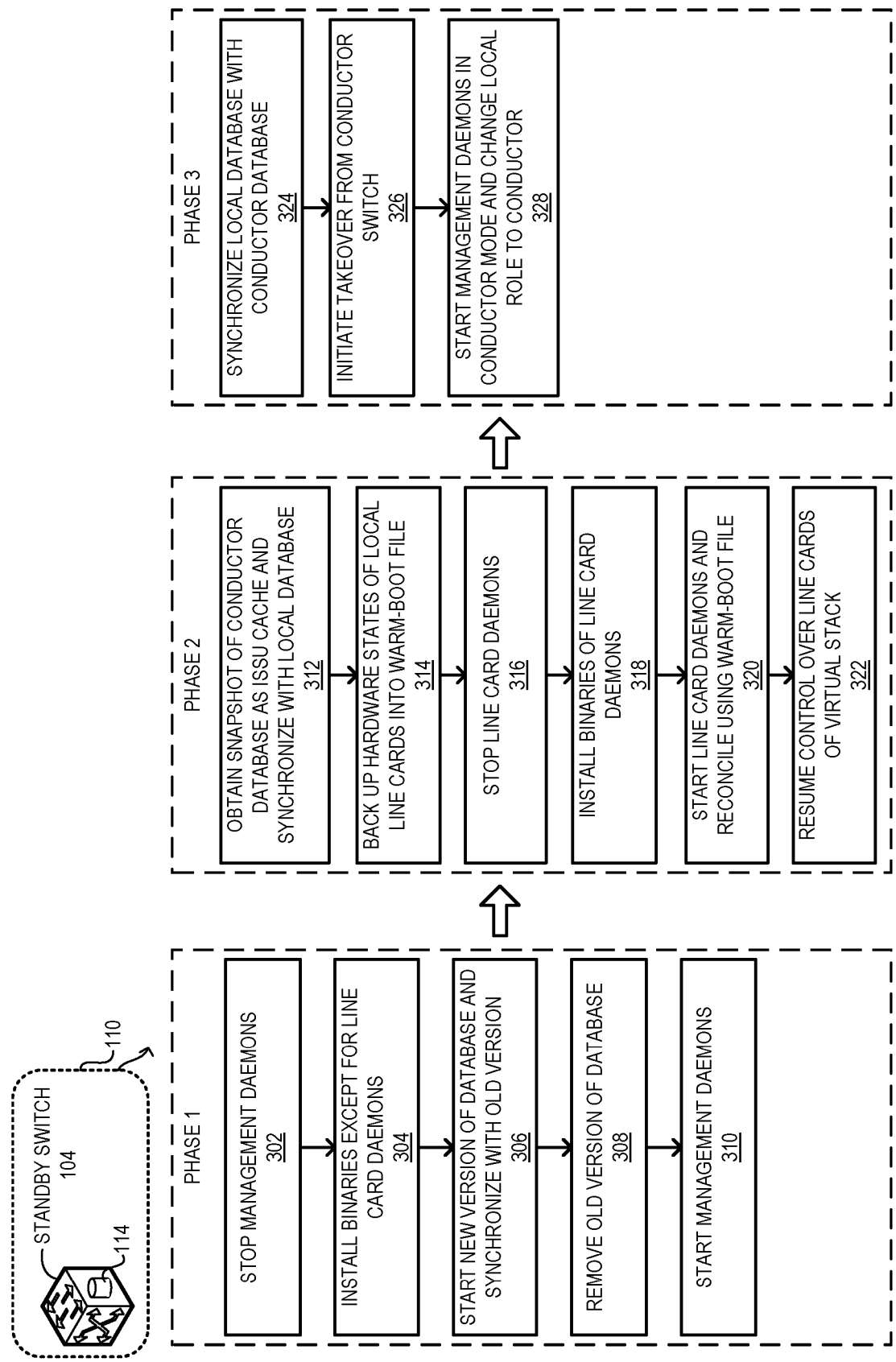
FIG. 3A illustrates an example of the phases of ISSU in a standby switch of a virtual switching stack, in accordance with an aspect of the present application.

FIG. 3A illustrates an example of the phases of ISSU in a standby switch of a virtual switching stack, in accordance with an aspect of the present application. During phase one, standby switch 104 can stop the management daemons (operation 302) and install the binaries except for the line card daemons (operation 304). Switch 104 can then start the new version of database 114 (and corresponding database server) and synchronize with the old version of database 114 (operation 306). Subsequently, switch 104 can remove the old version of database 114 (operation 308) and start the management daemons (operation 310).

During phase two, switch 104 can obtain the snapshot of the conductor database as the ISSU cache and synchronize with local database 114 (operation 312). Switch 104 can then back up the hardware states of the local line cards into a warm-boot file (operation 314), stop the line card daemons (operation 316), and install the binaries of the line card daemons (operation 318). Subsequently, switch 104 can start the line card daemons and reconcile the hardware states using the warm-boot file (operation 320). Switch 104 can then resume the control over the line cards of stack 110 (operation 322).

During phase three, switch 104 can synchronize local database 114 with the conductor database (i.e., database 112 of switch 102 in FIG. 1A) (operation 324). Switch 104 can then initiate the takeover from the conductor switch (operation 326). Subsequently, switch 104 can start the management daemons in the conductor mode and change the local role to a conductor (operation 328). In this way, standby switch 104 can be upgraded with ISSU without impacting the flow of traffic through switch 104. When the upgrade process is complete, switch 104 can start operating as the new conductor for stack 110.

Figure 3B:
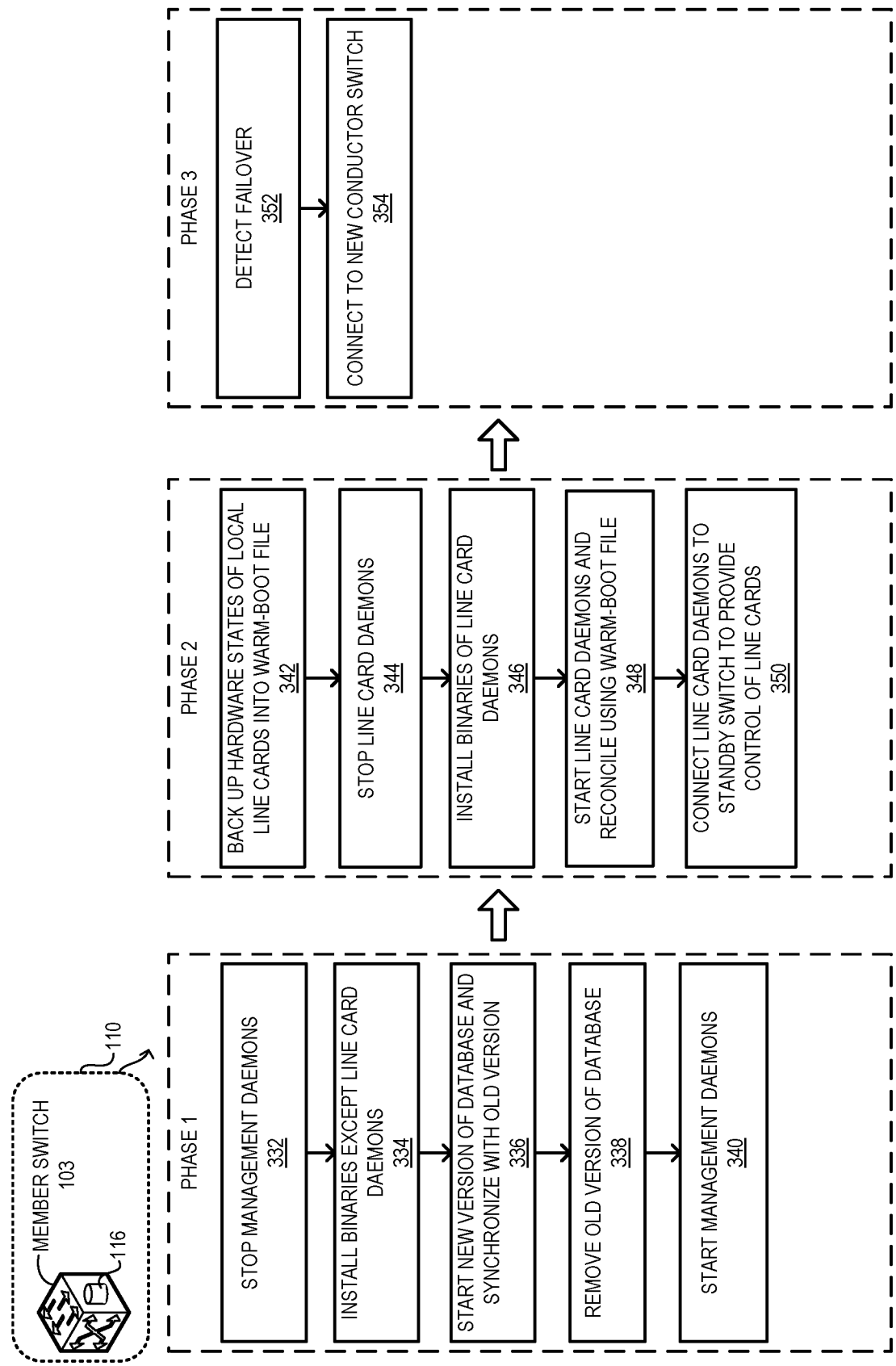
FIG. 3B illustrates an example of the phases of ISSU in a member switch of a virtual switching stack, in accordance with an aspect of the present application.

FIG. 3B illustrates an example of the phases of ISSU in a member switch of a virtual switching stack, in accordance with an aspect of the present application. During phase one, member switch 103 can stop the management daemons (operation 332) and install the binaries except for the line card daemons (operation 334). The management daemons on switch 103 can include the platform and helper daemons, and may exclude the control daemons. Switch 103 can then start the new version of database 116 (and corresponding database server) and synchronize with the old version of database 116 (operation 336). Subsequently, switch 103 can remove the old version of database 116 (operation 338) and start the management daemons (operation 340).

During phase two, switch 103 can back up the hardware states of the local line cards into a warm-boot file (operation 342), stop the line card daemons (operation 344), and install the binaries of the line card daemons (operation 346). Subsequently, switch 103 can start the line card daemons and reconcile the hardware states using the warm-boot file (operation 348). Switch 103 can then connect the line card daemons to the standby switch (e.g., switch 104) to provide control over the line cards of stack 110 (operation 350). During phase three, switch 103 can detect a failover (operation 352) and connect to the new conductor switch (operation 354).

Figure 3C:
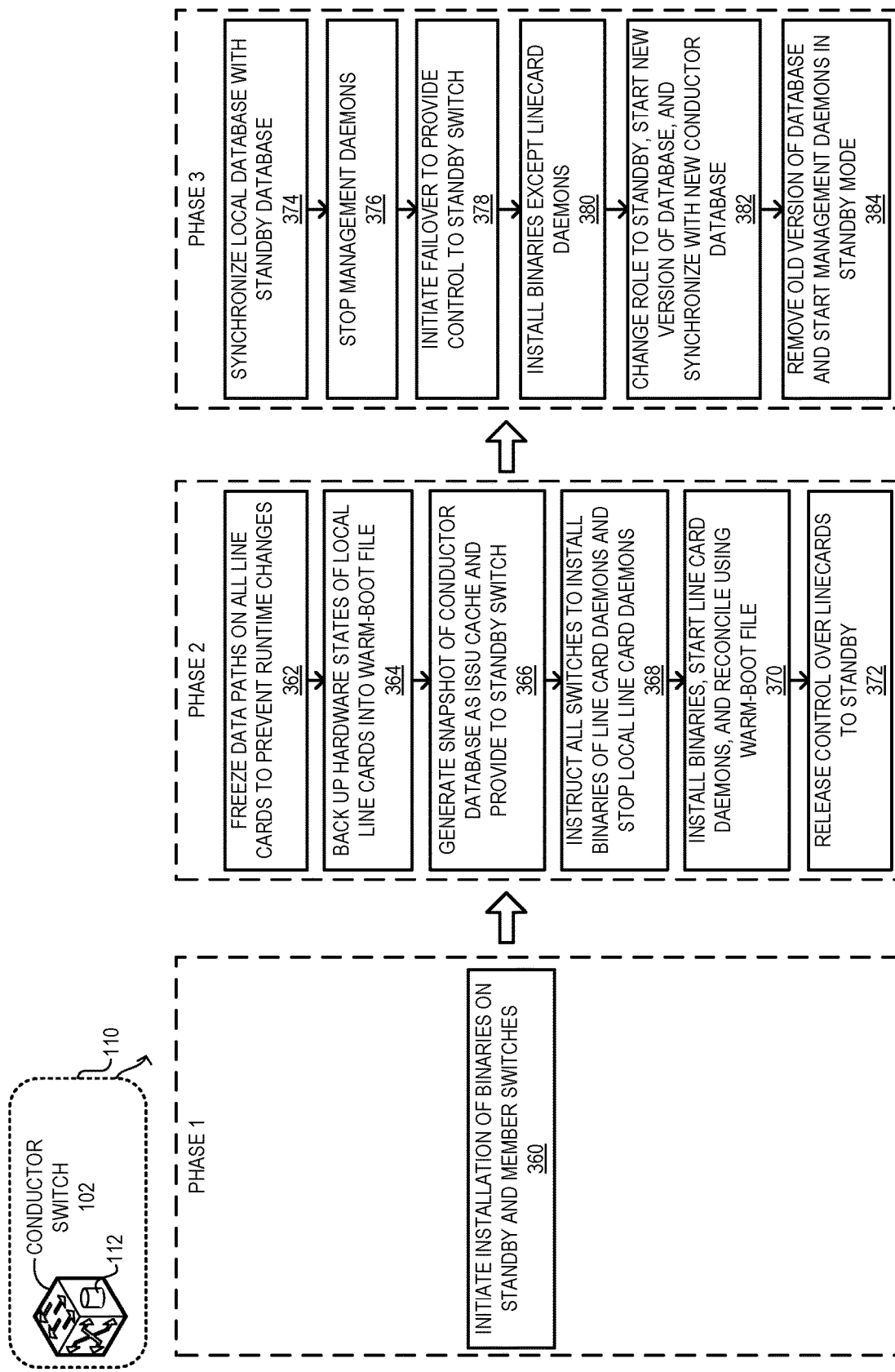
FIG. 3C illustrates an example of the phases of ISSU in a conductor switch of a virtual switching stack, in accordance with an aspect of the present application.

FIG. 3C illustrates an example of the phases of ISSU in a conductor switch of a virtual switching stack, in accordance with an aspect of the present application. During phase one, conductor switch 102 can initiate the installation of binaries on the standby and member switches (operation 360). During phase two, switch 102 can freeze the data paths on all line cards of stack 110 to prevent runtime changes (operation 362). Switch 102 can then back up the hardware states of the local line cards into a warm-boot file (operation 364). Switch 102 can also generate the snapshot of conductor database 112 as the ISSU cache and provide the snapshot to the standby switch (e.g., switch 104 in FIG. 1A) (operation 366).

Switch 102 can then instruct all switches to install the binaries of the line card daemons and stop the local line card daemons (operation 368). Switch 102 can install the binaries of the line card daemons, start the line card daemons, and reconcile the hardware states using the warm-boot file (operation 370). Switch 102 can then release the control over the line cards of stack 110 (operation 372). During phase three, switch 102 can synchronize local database 112 with the standby database (i.e., database 114 of switch 104 in FIG. 1A) (operation 374). Switch 102 can stop the management daemons (operation 376) and initiate the failover to provide the control to the standby switch (operation 378).

Subsequently, switch 102 can install the binaries except for the line card daemons (operation 380). Switch 102 can then change the local role to standby, start the new version of database 112 (and corresponding database server), and synchronize with new conductor database 114 (operation 382). Switch 104 can remove the old version of database 112 and start the management daemons in the standby mode (operation 384). In this way, conductor switch 102 can be upgraded with ISSU without impacting the flow of traffic through switch 102. When the upgrade process is complete, switch 102 can start operating as the new standby for stack 110.

Figure 4:
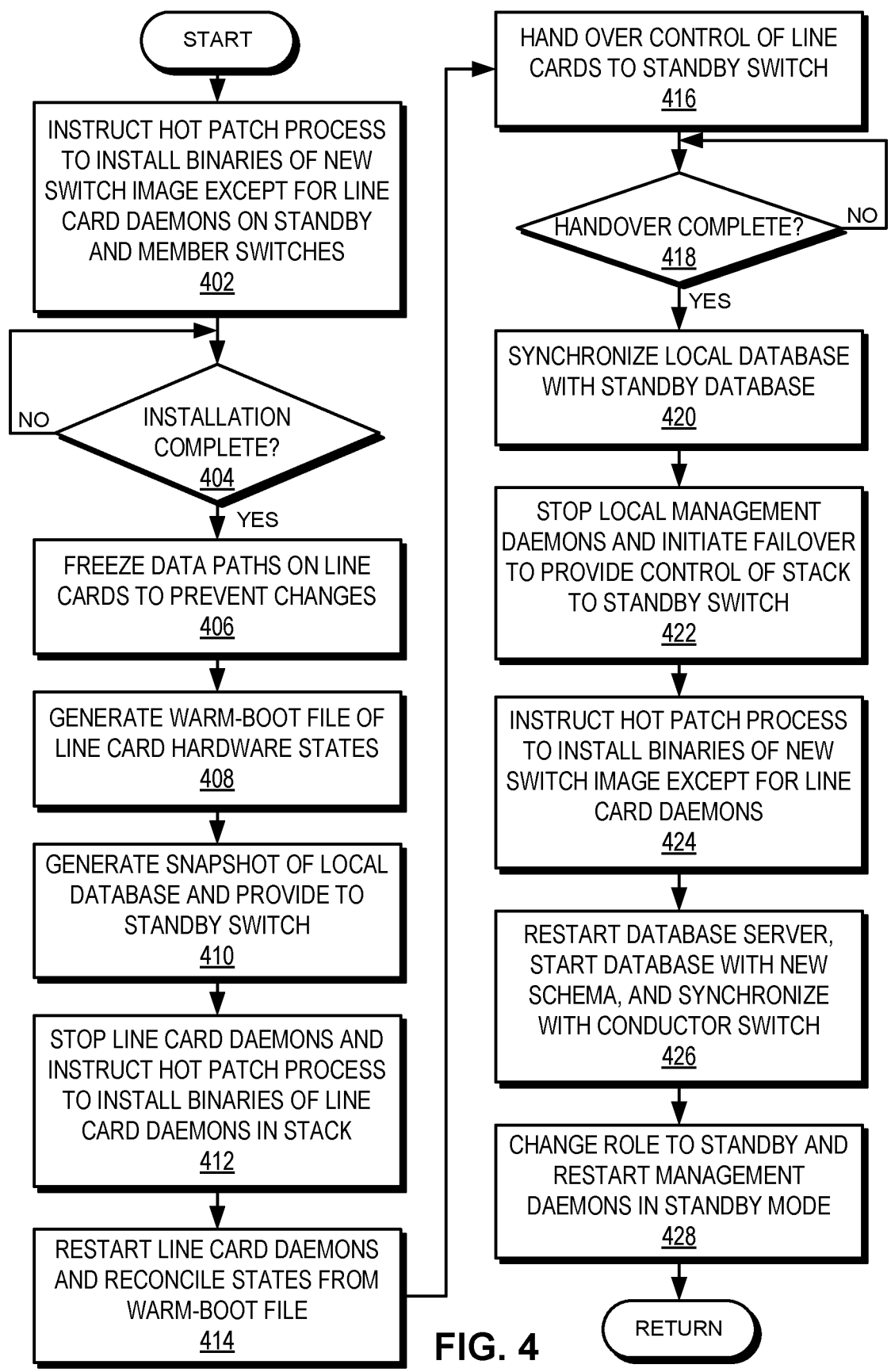
FIG. 4 presents a flowchart illustrating the process of a conductor switch in a virtual switching stack facilitating ISSU, in accordance with an aspect of the present application.

FIG. 4 presents a flowchart illustrating the process of a conductor switch in a virtual switching stack facilitating ISSU, in accordance with an aspect of the present application. During operation, the switch can instruct the hot patch process to install binaries of the new switch image except for the line card daemons on the standby and member switches (operation 402) and determine whether the installation is complete (operation 404). The switch can continue to wait for the installation to complete on the standby and member switches. On the other hand, when the installation is complete, the switch can freeze the data paths on the line cards to prevent changes (operation 406) and generate a warm-boot file of the line card hardware states (operation 408).

The switch can generate a snapshot of the local database and provide the snapshot to the standby switch (operation 410). The switch can stop the line card daemons and instruct the hot patch process to install the binaries of the line card daemons in the stack (e.g., on all switches) (operation 412). The switch can restart the line card daemons and reconcile states from the warm-boot file (operation 414). Subsequently, the switch can hand over the control of the line cards to the standby switch (operation 416) and determine whether the handover is complete (operation 418). The switch can continue to wait for the handover to complete on the standby and member switches.

On the other hand, when the handover is complete, the switch can synchronize the local database with the standby database (operation 420). The switch can then stop the local management daemons and initiate a failover to provide the control of the stack to the standby switch (operation 422). The switch can instruct the hot patch process to install binaries of the new switch image except for the line card daemons on the local switch (operation 424). The switch can then restart the database server, stand the database with the new schema, and synchronize with the new conductor switch (operation 426). The switch can then change its role to a standby switch and restart the management daemons in the standby mode (operation 428).

Figure 5A:
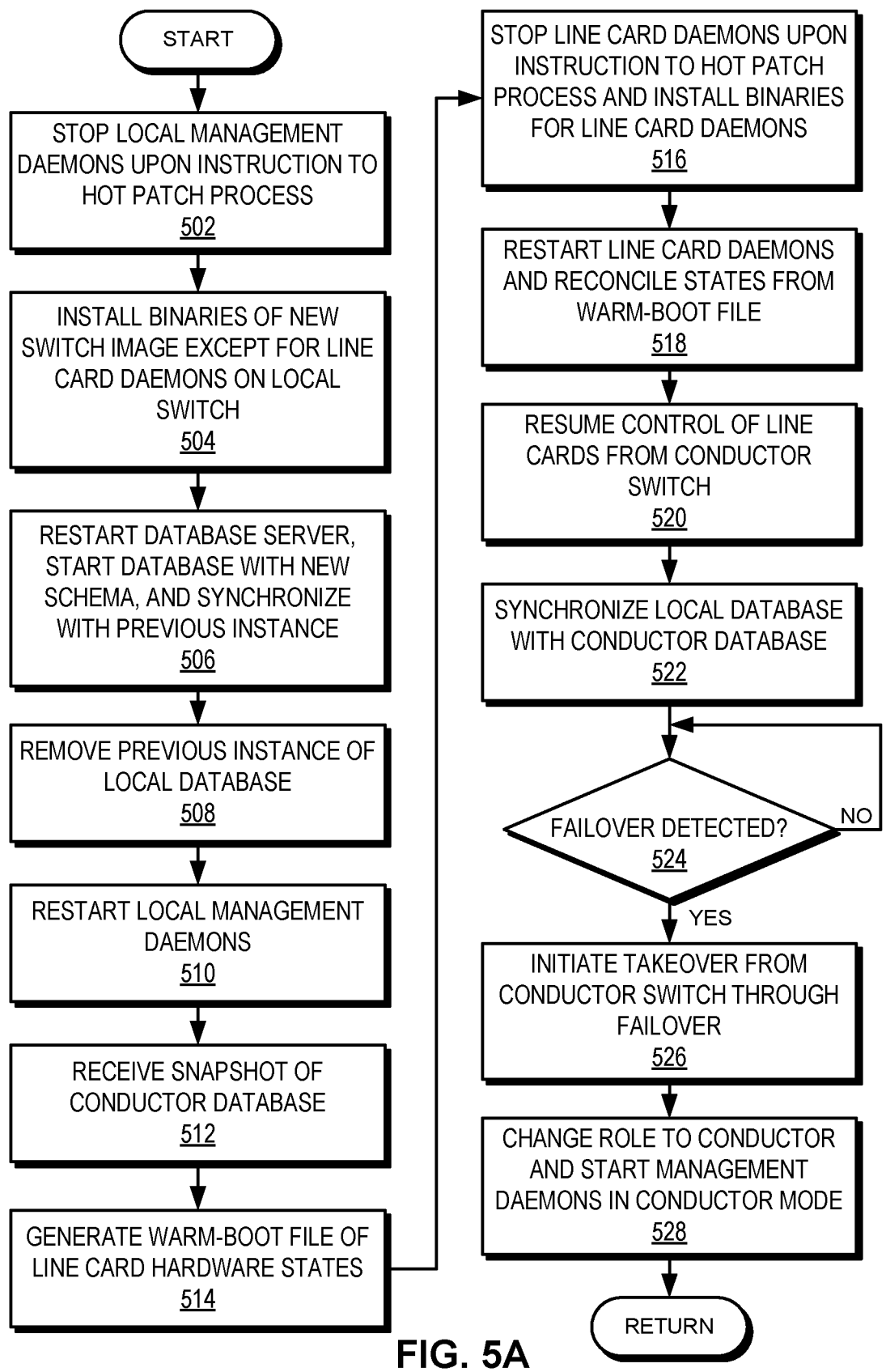
FIG. 5A presents a flowchart illustrating the process of a standby switch in a virtual switching stack facilitating ISSU, in accordance with an aspect of the present application.

FIG. 5A presents a flowchart illustrating the process of a standby switch in a virtual switching stack facilitating ISSU, in accordance with an aspect of the present application. During operation, the switch can stop the local management daemons upon the instruction to the hot patch process (operation 502) and install binaries of the new switch image except for the line card daemons on the local switch (operation 504). The switch can then restart the database server, stand the database with the new schema, and synchronize with the previous instance (operation 506). The switch can remote the previous instance of the local database (operation 508).

The switch can restart the local management daemons (operation 510). Subsequently, the switch can receive a snapshot of the conductor database (operation 512) and generate a warm-boot file of the line card hardware states (operation 514). The switch can stop the line card daemons upon instruction to the hot patch process and install the binaries for the line card daemons (operation 516). The switch can then restart the line card daemons and reconcile the states from the warm-boot file (operation 518).

The switch can resume the control of the line cards from the conductor switch (operation 520) and synchronize the local database with the conductor database (operation 522). The switch can determine whether the failover is detected (operation 524). The switch can continue to wait for the failover to be detected. On the other hand, when the failover is detected, the switch can initiate the takeover from the conductor switch through failover (operation 526). The switch can then change its role to a conductor switch and start the management daemons in a conductor mode (operation 528).

Figure 5B:
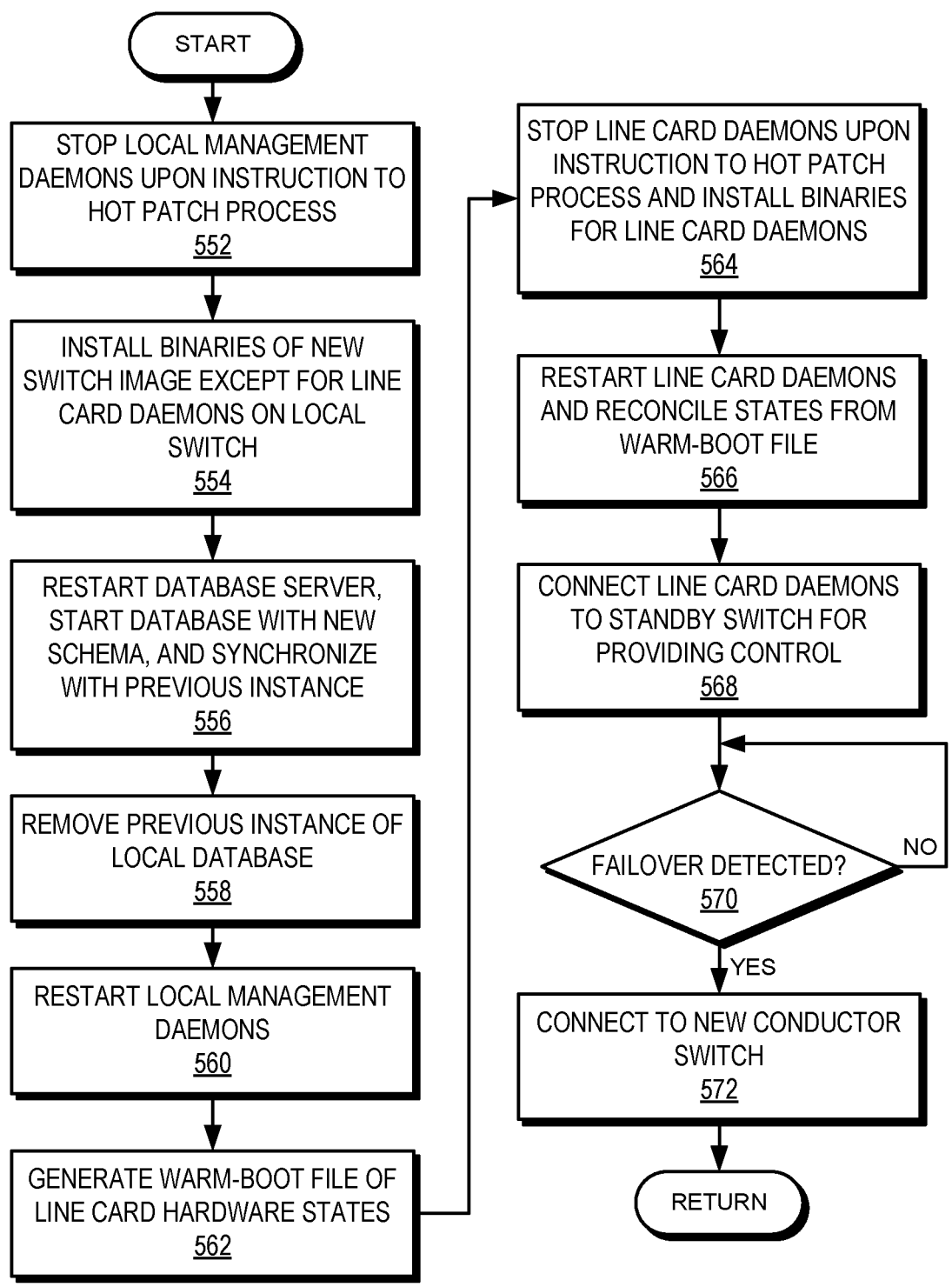
FIG. 5B presents a flowchart illustrating the process of a member switch in a virtual switching stack facilitating ISSU, in accordance with an aspect of the present application.

FIG. 5B presents a flowchart illustrating the process of a member switch in a virtual switching stack facilitating ISSU, in accordance with an aspect of the present application. During operation, the switch can stop the local management daemons upon the instruction to the hot patch process (operation 552) and install binaries of the new switch image except for the line card daemons on the local switch (operation 554). The switch can then restart the database server, stand the database with the new schema, and synchronize with the previous instance (operation 556). The switch can remote the previous instance of the local database (operation 558). The switch can restart the local management daemons (operation 560).

Subsequently, the switch can generate a warm-boot file of the line card hardware states (operation 562). The switch can stop the line card daemons upon instruction to the hot patch process and install the binaries for the line card daemons (operation 564). The switch can then restart the line card daemons and reconcile the states from the warm-boot file (operation 566). The switch can connect the line card daemons to the standby switch for providing the control (operation 568). The switch can determine whether the failover is detected (operation 570). The switch can continue to wait for the failover to be detected. On the other hand, when the failover is detected, the switch can connect to the new conductor switch (e.g., using a control IP address) (operation 572).

Figure 6:
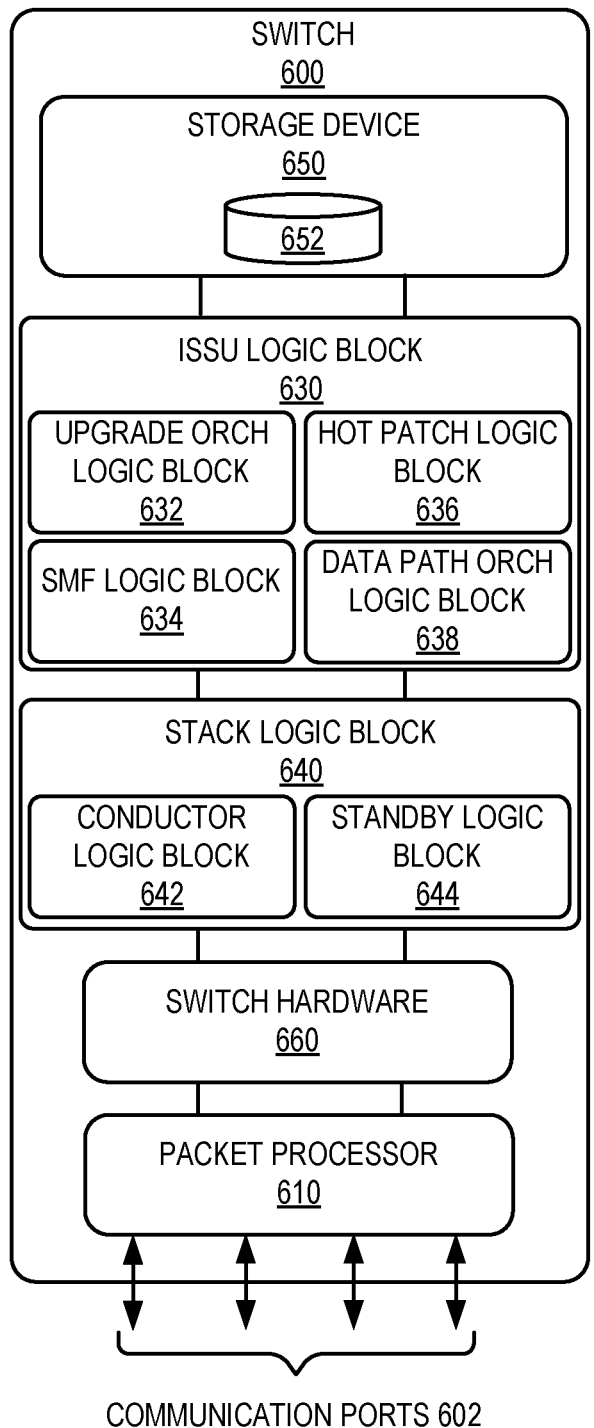
FIG. 6 illustrates an example of a switch in a virtual switching stack facilitating ISSU, in accordance with an aspect of the present application.

FIG. 6 illustrates an example of a switch supporting efficient port reconfiguration based on independent data and control planes, in accordance with an aspect of the present application. In this example, a switch 600 can include a number of communication ports 602, a packet processor 610, and a storage device 650. Switch 600 can also include switch hardware 660 (e.g., processing hardware of switch 600, such as ASIC chips), which includes information based on which switch 600 processes packets (e.g., determines output ports for packets). In other words, switch hardware 660 includes switching circuitry for switch 600. Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include an ISSU logic block 630 that can facilitate ISSU for switch 600. ISSU logic block 630 can include an upgrade orchestrator logic block 632, an SMF logic block 634, a hot patch logic block 636, and a data path orchestrator logic block 638. Logic blocks 632, 634, 636, and 638 can correspond to upgrade orchestrator 152, SMF 154, hot patch process 156, and data path orchestrator 158, respectively, of FIG. 1B.

Upgrade orchestrator logic block 632 can include a process for orchestrating ISSU in a virtual switching stack that includes switch 600. Hot patch logic block 636 can install the binaries from a new switch image on switch 600. SMF logic 634 can migrate database 652 from an older version to a newer version. Accordingly, SMF 154 can upgrade the schema of database 652. In addition, data path orchestrator 638 can upgrade the line card daemon of switch 600 without impacting the traffic flow through a line card, which may provide a subset of ports 602.

Switch 600 can also include a stack logic block 640 that can operate switch 600 as a member of a virtual switching stack. Stack logic block 640 can include a conductor logic block 642 and a standby logic block 644. Conductor logic block 642 can allow switch 600 to operate as a conductor switch of the stack. Furthermore, standby logic block 642 can allow switch 600 to operate as a standby switch of the stack and facilitate a failover if needed.

One aspect of the present technology can provide a system for facilitating in-service software upgrade (ISSU) for a switch in a virtual switching stack including a plurality of switches operating on a unified control plane. During operation, the system can initiate, for a new switch image, ISSU on the switch based on a plurality of phases that facilitate uninterrupted traffic flow via the virtual switching stack. The system can upgrade, in a first phase, a first set of daemons of the switch that manage operations of the switch based on the new switch image. The system can also upgrade, in the first phase, a database stored on the switch based on the new switch image. The database can store operational information of the switch based on which the switch forwards traffic in the network. The system can further upgrade, in a second phase based on the new switch image, a second set of daemons of the switch that configure forwarding information on the forwarding hardware of the switch and facilitate data-plane operations for the switch. The forwarding information configured on the forwarding hardware can remain unchanged during the upgrade. Subsequently, the system can configure the upgraded second set of daemons to obtain control-plane information from a standby switch functioning as a backup for a conductor switch of the virtual switching stack, thereby upgrading the switch without interrupting traffic at the switch. The conductor switch can facilitate the unified control plane of the virtual switching stack.

In a variation on this aspect, the switch operates as the standby switch. The system can upgrade, in a third phase, a role of the switch to a new conductor switch for the virtual switching stack.

In a variation on this aspect, upgrading the database stored on the switch can include transitioning the database to a new version operating based on a new schema. The system can then synchronize the new version of the database with a previous version of the database.

In a further variation, the system can upgrade, in the first phase based on the new switch image, a database server that manages the operations of the database.

In a further variation, the system can obtain, in the second phase, a snapshot of a second database of the conductor switch. Here, the second database operates based on the previous version. The system can then synchronize the new version of the database with the snapshot.

In a variation on this aspect, the system can forward traffic using the forwarding hardware of the switch based on the forwarding information while upgrading the second set of daemons.

In a variation on this aspect, the system can store, in the second phase, state information of the forwarding hardware in a state file. The system can then reconcile the state information for the upgraded second set of daemons based on the state file.

In a variation on this aspect, the switch can operate as a member switch of the virtual switching stack. The system can detect, in a third phase, a failover from the conductor switch to the standby switch. The system can then connect to the standby switch for associating with the unified control plane of the virtual switching stack.

Another aspect of the present technology can provide a system for facilitating in-service software upgrade (ISSU) for a switch in a virtual switching stack including a plurality of switches operating on a unified control plane. During operation, the system can initiate, for a new switch image, ISSU on the switch based on a plurality of phases that facilitate uninterrupted traffic flow via the virtual switching stack. The system can instruct, in a first phase, a remote switch to upgrade a first set of daemons of the remote switch that manage operations of the remote switch based on the new switch image. The system can also instruct, in the first phase, the remote switch to upgrade a remote database stored on the remote switch based on the new switch image. The remote database stores operational information of the remote switch based on which the switch forwards traffic in the network. The system can further upgrade, in a second phase based on the new switch image, a second set of daemons of the switch that configure forwarding information on the forwarding hardware of the switch and facilitate data-plane operations for the switch. The forwarding information configured on the forwarding hardware can remain unchanged during the upgrade. Subsequently, the system can configure the upgraded second set of daemons to obtain control-plane information from a standby switch functioning as a backup for a conductor switch of the virtual switching stack, thereby upgrading the switch without interrupting traffic at the switch. The conductor switch can facilitate the unified control plane of the virtual switching stack.

In a variation on this aspect, the switch operates as the conductor switch. The system can upgrade, in a third phase, the first set of daemons of the switch based on the new switch image. The system can also upgrade, in the third phase, a local database stored on the switch based on the new switch image.

In a further variation, the system can trigger, in the third phase, a failover to hand over the management of the unified control plane to the standby switch.

In a further variation, upgrading the local database stored on the switch can include transitioning the local database to a new version operating based on a new schema. The system can then synchronize the local database with a database stored on the standby switch.

In a further variation, the system can upgrade, in the third phase based on the new switch image, a database server that manages the operations of the local database.

In a further variation, the system can generate, in the second phase, a snapshot of the local database and send the snapshot to the conductor switch.

In a variation on this aspect, the system can forward traffic using the forwarding hardware of the switch based on the forwarding information while upgrading the second set of daemons.

In a variation on this aspect, the system can store, in the second phase, state information of the forwarding hardware in a state file. The system can then reconcile the state information for the upgraded second set of daemons based on the state file.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
    initiating, for a new switch image, in-service software upgrade (ISSU) for a switch in a virtual switching stack based on a plurality of phases that facilitate uninterrupted traffic flow via the virtual switching stack, wherein the virtual switching stack includes a plurality of switches operating on a unified control plane;
    upgrading, in a first phase, a first set of daemons of the switch that manage operations of the switch based on the new switch image;
    upgrading, in the first phase, a database stored on the switch based on the new switch image, wherein the database stores operational information of the switch based on which the switch forwards traffic in the network;
    upgrading, in a second phase based on the new switch image, a second set of daemons of the switch capable of configuring forwarding information on forwarding hardware of the switch and facilitate data-plane operations for the switch, wherein the forwarding information configured on the forwarding hardware remains unchanged during the second phase while the second set of daemons are being upgraded;
    configuring the upgraded second set of daemons to obtain control-plane information from a standby switch functioning as a backup for a conductor switch of the virtual switching stack, wherein the conductor switch facilities the unified control plane of the virtual switching stack; and
    in response to detecting a triggered failover from the conductor switch to the standby switch, connecting to the standby switch for associating with the unified control plane of the virtual switching stack.

2. The method of claim 1,
    further comprising upgrading, in a third phase, a role of the switch to a new conductor switch for the virtual switching stack.

3. The method of claim 1, wherein upgrading the database stored on the switch comprises transitioning the database to a new version operating based on a new schema;
    wherein the method further comprises synchronizing the new version of the database with a previous version of the database.

4. The method of claim 3, further comprising upgrading, in the first phase based on the new switch image, a database server that manages the operations of the database.

5. The method of claim 3, further comprising:
    obtaining, in the second phase, a snapshot of a second database of the conductor switch, wherein the second database operates based on the previous version; and
    synchronizing the new version of the database with the snapshot.

6. The method of claim 1, further comprising forwarding traffic using the forwarding hardware of the switch based on the forwarding information while upgrading the second set of daemons.

7. The method of claim 1, further comprising:
    storing, in the second phase, state information of the forwarding hardware in a state file; and
    reconciling, by the upgraded second set of daemons, the state information based on the state file.

8. A method comprising:
    initiating, for a new switch image, in-service software upgrade (ISSU) for a switch in a virtual switching stack based on a plurality of phases that facilitate uninterrupted traffic flow via the virtual switching stack, wherein the virtual switching stack includes a plurality of switches operating on a unified control plane;
    instructing, in a first phase, a remote switch to upgrade a first set of daemons of the remote switch that manage operations of the remote switch based on the new switch image;
    instructing, in the first phase, the remote switch to upgrade a remote database stored on the remote switch based on the new switch image, wherein the remote database stores operational information of the remote switch based on which the switch forwards traffic in the network;
    upgrading, in a second phase based on the new switch image, a second set of daemons of the switch capable of configuring forwarding information on forwarding hardware of the switch and facilitate data-plane operations for the switch, wherein the forwarding information configured on the forwarding hardware remains unchanged during the second phase while the second set of daemons are being upgraded;
    triggering a failover to a standby switch functioning as a backup for a conductor switch of the virtual switching stack; and
    configuring the upgraded second set of daemons to obtain control-plane information from the standby switch wherein the conductor switch facilities the unified control plane of the virtual switching stack.

9. The method of claim 8,
    wherein the method further comprises:
        upgrading, in a third phase, the first set of daemons of the switch based on the new switch image; and
        upgrading, in the third phase, a local database stored on the switch based on the new switch image.

10. The method of claim 6, wherein the method further comprises triggering, in the third phase, a failover to hand over management of the unified control plane to the standby switch.

11. The method of claim 9, wherein upgrading the local database stored on the switch comprises transitioning the local database to a new version operating based on a new schema;
    wherein the method further comprises synchronizing the local database with a database stored on the standby switch.

12. The method of claim 9, further comprising upgrading, in the third phase based on the new switch image, a database server that manages the operations of the database.

13. The method of claim 9, further comprising:
    generating, in the second phase, a snapshot of the local database; and
    sending the snapshot to the conductor switch.

14. The method of claim 8, further comprising forwarding traffic using the forwarding hardware of the switch based on the forwarding information while upgrading the second set of daemons.

15. The method of claim 8, further comprising:
    storing, in the second phase, state information of the forwarding hardware in a state file; and
    reconciling, by the upgraded second set of daemons, the state information based on the state file.

16. The method of claim 8, wherein the switch operates as the conductor switch;

wherein the method further comprises upgrading, in a third phase, a role of the switch to a new standby switch for the virtual switching stack.

17. A non-transitory computer-readable storage medium storing instructions that when executed by a computer cause the computer to perform a method, the method comprising:

initiating, for a new switch image, in-service software upgrade (ISSU) for a switch in a virtual switching stack based on a plurality of phases that facilitate uninterrupted traffic flow via the virtual switching stack, wherein the virtual switching stack includes a plurality of switches operating on a unified control plane;

instructing, in a first phase, a remote switch to upgrade a first set of daemons of the remote switch that manage operations of the remote switch based on the new switch image;

instructing, in the first phase, the remote switch to upgrade a database stored on the remote switch based on the new switch image, wherein the database stores operational information of the remote switch based on which the switch forwards traffic in the network;

upgrading, in a second phase based on the new switch image, a second set of daemons of the switch capable of configuring forwarding information on forwarding hardware of the switch and facilitate data-plane operations for the switch, wherein the forwarding information configured on the forwarding hardware remains unchanged during the second phase while the second set of daemons are being upgraded;

configuring the upgraded second set of daemons to obtain control-plane information from a standby switch functioning as a backup for a conductor switch of the virtual switching stack, wherein the conductor switch facilities the unified control plane of the virtual switching stack; and in response to detecting a triggered failover from the conductor switch to the standby switch, connecting to the standby switch for associating with the unified control plane of the virtual switching stack.

18. The non-transitory computer-readable storage medium of claim 17, wherein upgrading the database stored on the switch comprises transitioning the database to a new version operating based on a new schema;

wherein the method further comprises synchronizing the new version of the database with a previous version of the database.

19. The non-transitory computer-readable storage medium of claim 17, wherein the method further comprises:

storing, in the second phase, state information of the forwarding hardware in a state file; and reconciling, by the upgraded second set of daemons, the state information based on the state file.

20. The non-transitory computer-readable storage medium of claim 17, wherein the method further comprises forwarding traffic using the forwarding hardware of the switch based on the forwarding information while upgrading the second set of daemons.

\* \* \* \* \*